Patented June 7, 1938

2,120,105

UNITED STATES PATENT OFFICE 2,120,105

HAT AND METHOD FOR PREPARING THE SAME

Harry G. Macintosh, Montclair, N. J.

No Drawing. Application September 10, 1936, Serial No. 100,157

8 Claims. (Cl. 92—55)

This invention relates to a novel fabric for hats and to a novel method for making the same. In one of its aspects the invention is directed particularly to novel preformed hats as well as to a novel method of making the same.

An object of my invention is to provide a novel hat fabric which may be produced if desired from scraps or already worn and discarded articles at a reasonably low cost.

Another object of my invention is to provide a novel hat at a relatively low cost.

Another object of my invention is to provide a novel method for making my novel hat fabric.

These and other objects of my invention will be readily apparent from the following description.

According to my invention I make a dispersion of a substance such as fur, hair, paper, straw, silk, cotton, cellulose fibre or the like. Since I may begin with any one of the above substances or an equivalent thereof, I shall describe my invention as applied to fur for the sake of illustration, although it is to be understood that my invention may be successfully practiced with the other substances alone or combined by practicing the steps herein set forth.

A batch of what is known in the hat art as "hatter's fur" is placed in a mill adapted to reduce the fur to a colloidal or dispersed state. A ball mill is suitable for this purpose. To the ball mill containing the fur is added a water solution of caustic soda or caustic potash. The mill containing the fur and caustic solution is operated over an extended period of time until a good portion or all of the fur has been reduced to particles of very fine size, and of such size that these particles exhibit Brownian movement and are, therefore, in a colloidal or dispersed state. By colloidal or dispersed particles, I mean particles of such small size that they exhibit Brownian movement in the continuous phase of the dispersion.

To this dispersion of the fur particles of irregular shape and sizes in the caustic solution, I add a paste consisting of zinc oxide and a filler of whiting, together with a binder of latex, gum acacia or tragacanth. The entire mass is stirred to distribute said newly added substances substantially uniformly throughout the dispersion. Then a quantity of ammonium polysulphide or sulphur chloride or both is added to the dispersion. The added sulphide reacts with the zinc oxide in said dispersion to form zinc sulphide which causes the particle size of the fur particles to build up by agglomerating. During and after the addition of the ammonium polysulphide or sulphur chloride to the dispersion, the dispersion is agitated by stirring or the like until the particle size of the colloidal dispersed particles has been considerably built up. The time and rate of stirring are factors in the control of the agglomerated particle size.

When the zinc sulphide is formed in the dispersion there occurs agglomeration of the rubber particles as well as the fur particles. Although I prefer the employment of zinc sulphide, other well known agglomerating agents for agglomerating fur particles may be employed.

Then the particles in the dispersion are deposited on a base from which they may be later stripped in the form of a fabric. In the manufacture of hats I employ a suitable hat shaped rigid screen support covered with a fine weave material, such as canvas, which will retain the particles suspended in the liquid medium. A vacuum may be applied to the under surface of the screen. While the canvas is covered with the dispersion, the liquid phase thereof is drawn through the canvas and screen, leaving on the screen a mass of agglomerated fur particles, with zinc sulphide, a filler such as whiting and a binder such as rubber, gum acacia or tragacanth uniformly distributed therethrough.

Instead of depositing the suspended matter from the dispersion by the vacuum method, it is within the purview of my invention to deposit them electrolytically on an electrode of suitable form and a hat form when a hat is desired.

In either case, the deposition, or the form whether it be the canvas used in the vacuum method or any other type of form, is stripped therefrom after the deposit has attained the desired thickness.

The raw hat thus formed, is of the same general shape as the hat will be when in a finished state. It consists of a large number of agglomerations of interlocked fur particles of colloidal dimensions with an agglomerating agent between the particles, a filler of whiting distributed throughout the mass and between the agglomerations and a binder, such as rubber, gum acacia or tragacanth covering the agglomeration. The binder functions to secure the agglomerated fur together. If desired the raw hat may be subjected to a curing action to cure the rubber therein.

Although I have described my invention as applied to fur, it is to be distinctly understood that it may be employed with any one of the substances heretofore mentioned, and I am to be limited only by the prior art.

What is claimed:

1. A hat material comprising a plurality of agglomerates, and a binder for said agglomerates, said agglomerates including a plurality of fur particles of colloidal dimensions, and a sulphur containing agglomerating agent.

2. A hat material comprising a plurality of agglomerates, a filler and a binder, said agglomerates including a plurality of interlocking fur particles of colloidal dimensions and a metallic sulphide agglomerating agent.

3. The method for making a hat material comprising reducing a fibrous substance to a colloidal state in the presence of a fluid, forming a sulphur containing agglomerating agent in situ, agglomerating the colloid, adding a binder to the fluid and depositing the binder and agglomerated fiber on a base and removing the mass from the base.

4. The method of making a hat material comprising in the presence of an alkaline fluid converting a fiber substance into a colloidal state in said fluid, with a sulphur containing agglomerating agent increasing the particle size of said fiber in the colloidal state, adding a binder to said fluid and depositing said fiber substance and binder on a form whose general configuration is that of the hat when in a finished state.

5. The method of making a hat material comprising in the presence of a caustic fluid reducing "hatter's fur" to a colloidal state in said fluid, forming a sulphur containing agglomerating agent in situ, agglomerating said particles of said colloid, adding a binder to said fluid and depositing said binder, agent and agglomerated particles on a form and stripping said deposited mass from said form.

6. The method of making a hat material comprising in the presence of a caustic fluid reducing "hatter's fur" to a colloidal state in said fluid, adding a rubber emulsion and a filler to said fluid, forming a sulphur containing agglomerant for said colloidal fur in situ, agglomerating said colloidal fur, and depositing said agglomerated fur particles, said binder and filler simultaneously.

7. A hat material comprising a plurality of agglomerates and a binder for said agglomerates, said agglomerates including a plurality of fur particles of colloidal dimensions and a zinc sulphide containing agglomerating agent.

8. The method of making a hat comprising in the presence of a caustic fluid reducing fur to a colloidal state in said fluid, adding zinc oxide and a compound of the group consisting of ammonium polysulphide and sulphur chloride to form an agglomerating agent in situ, and depositing the particles on a form.

HARRY G. MACINTOSH.